March 10, 1953 — D. W. JORDAN — 2,631,009
LOAD BRACING BAR
Filed April 21, 1949
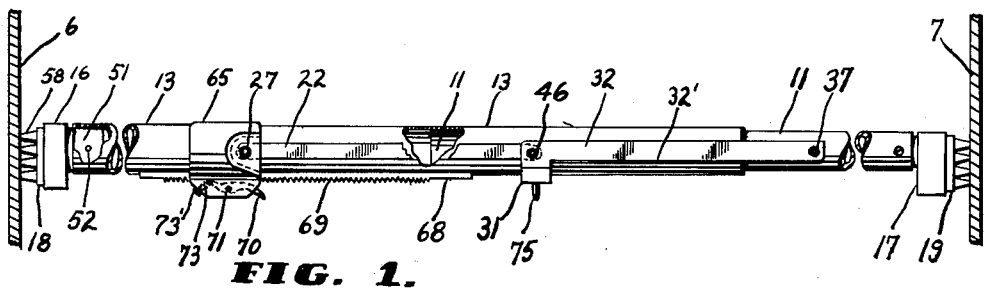
FIG. 1.
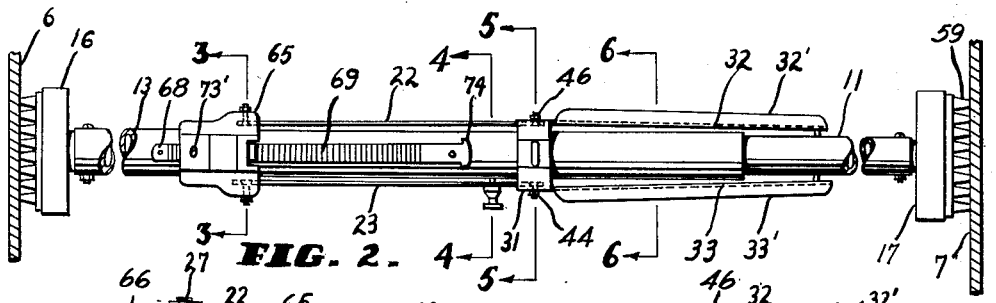
FIG. 2.
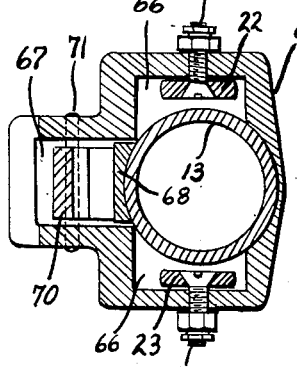 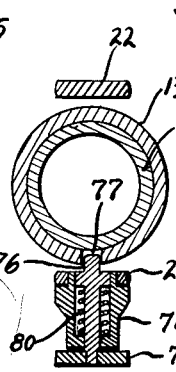 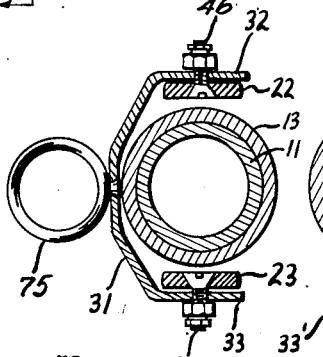 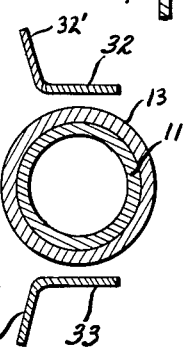
FIG. 3.  FIG. 4.  FIG. 5.  FIG. 6.
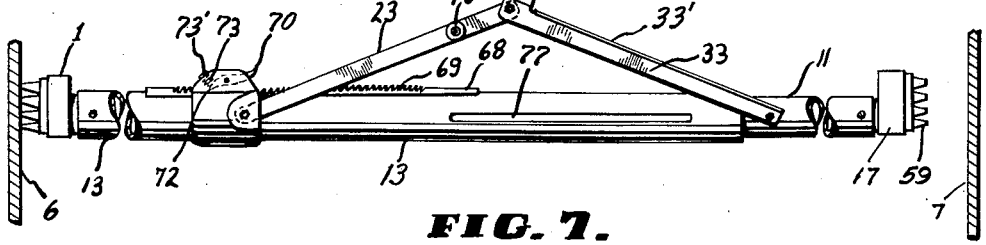
FIG. 7.
INVENTOR.
DORSEY W. JORDAN
BY
Attorney Patented Mar. 10, 1953

2,631,009

UNITED STATES PATENT OFFICE 2,631,009

LOAD BRACING BAR

Dorsey W. Jordan, Berkeley, Calif., assignor to Jordan Equipment Company, Oakland, Calif., a corporation of California Application April 21, 1949, Serial No. 88,721

9 Claims. (Cl. 254—123)

This invention relates to extensible load or cargo bracing bars of the type wherein a pair of telescoped tubes are forced to extend to impinge the walls of a cargo truck by means of a toggle lever, and the objects of the present invention are to provide improvements whereby the application of the bracing bar to the work to be done is greatly facilitated and the operation of the toggle joints of the bar is more effective and cannot accidentally be released, as by the surging of the cargo.

Other features and advantages of the improved construction will appear in the accompanying drawings and in the following description.

In the drawings:

Fig. 1 is a top plan view of the bracing bar shown locked in partially extended position as if in place between the side walls of a cargo or freight holding compartment.

Fig. 2 is a front side view of the bar of Fig. 1.

Fig. 3 is an enlarged cross section of Fig. 2 taken along the line 3—3 thereof.

Fig. 4 is an enlarged cross section of Fig. 2 taken along the line 4—4 thereof.

Fig. 5 is an enlarged cross section of Fig. 2 taken along the line 5—5 thereof.

Fig. 6 is an enlarged cross section of Fig. 2 taken along the line 6—6 thereof.

Fig. 7 is a bottom view of Fig. 1 showing the ends of the bar constructed with the toggle joint released to reveal the toggle locking slot in the outer slidable section of the bar.

The bracing bar may broadly be stated to comprise a pair of tubular sections, one telescoped within the other and projecting therefrom (and which inner one may be solid) so as to form an extensible "bar," toggle means for forcing the sections to extended position, and wall gripping pads at the outer ends of the telescoped assembly.

In the drawings the cargo container walls between which the bar of Fig. 1 is extended are respectively numbered 6 and 7. The outer tubular section of the bar is 13 and the inner one 11. The wall gripping pads are respectively 18 and 19 and preferably made of tough rubber or felt, though they may be of metal with somewhat sharper teeth 59 than shown. These pads are preferably tightly mounted in metal cups 16 and 17 provided with shanks 51 suitably bolted to the ends of the tubular members as at 52, or otherwise preferably removably secured in place.

The toggle means for spreading the telescopic tubes is a double one with a pair of toggle links on opposite sides of the bar assembly (top and bottom sides). One pair of toggle links is numbered 22 and 32 and the opposite pair 23 and 33, links 32 and 33 on opposite sides of the bar being cross connected over the bar by a rigid yoke member 31 and the inner ends of the links of each side of the bar are pivoted together as at 44 and 46 respectively to form the toggle knees, and the remote ends of the two pairs of links are respectively pivoted to the small tube 11 as at 37 and to a rider on the large tube 13 at 27, all so that both sets of toggle links may be operated as a unit when using the yoke as a handle.

The ends of the toggle links 22 and 23 are pivoted at 27 to a rider 65 or sliding block which is slidably mounted on tube 13 and formed with sockets 66 to receive the ends of the links and limit their movement when the toggle is released (see Fig. 3 at 66).

Sliding block 65 is also formed with a wide internal passage 67 which straddles a ratchet bar 68 secured to the outer side of outer tube 13 and which ratchet bar is provided with teeth 69 which cooperate with a spring pawl 70 pivoted at 71 to the sliding block and the inner end 72 of which pawl engages the teeth in a manner to permit the telescoped sections 11 and 13 to be extended yet stop them from return movement unless the outer free end 70 of the pawl is tripped as by pressure of a finger. A small coil spring indicated at 73 urges the pawl to normally engage the ratchet teeth. This spring reacts against a screw 73'.

The inner end of the ratchet bar is widened to provide shoulders 74 forming a final stop against block 65 in sliding the large tube 13 outwardly to extend or lengthen the bar.

Toggle links 32 and 33 are of L cross section (see Fig. 6) to provide elongated wings 32' and 33' to facilitate pushing the toggles to closed position, though the yoke 31 may also be pushed against, and the yoke is preferably provided with a ring 75 or other suitable finger grip for pulling out the links to release the toggles.

While yoke 31 may bear against the tube 13 when the toggles are locked I prefer to provide a positive lock in the form of a spring pin 76 (see Fig. 4) which engages a groove or slot 77 extending longitudinally in the outer side of tube 13, as this arrangement automatically locks the toggles at the point of maximum pressure without passing over center to slacken off slightly as heretofore required.

Spring pin 76 is slidably mounted in a boss 78 secured to the outer side of one of the toggle links (23) and the pin is provided with a knob 79 for pulling it outward a limited amount to withdraw its inner end from the slot. The actuating spring for the pin is indicated at 80 in Fig. 4.

Instead of the spring pin just described it is obvious without additional drawings that the inner end of the pin 76 may simply be secured to the link and the springiness of the link would snap it into the slot like a spring detent, and the link could be pried up to release the pin, or the knob 79 simply fixed to the link would serve for pulling the link outward to release the detent and collapse the toggle.

By reference to Figs. 1 and 3 it will be noted that sliding block 85 is quite thin on the back or cargo side of the bar (upper side in Fig. 1) to be substantially as flush with the bar, as are the end pads, so as to permit the bar to substantially contact the cargo from end to end of the bar.

With the above description the operation of the apparatus will be easily understood, it being only necessary to release the toggles, pull out the telescopic sections until the end pads are tight against the opposite walls of the truck, railway car, or other cargo container, and while the ratchet holds the bar in place push the toggles inward toward the cargo by pressing on the side wings 32', 33' and/or the yoke 31 to straighten the toggles, and pin 76 snaps into the locking groove 77.

Having thus described my improvements in an extensible load bracing bar of this type what I claim is:

1. In an extensible load bracing bar of the type comprising two telescoped tubular members with wall gripping pads at their outer ends and toggle means for forcing the sections outward for extending the bar, the improvement which comprises said sections provided with ratchet means for extending and contracting the overall length of the bar independently of said toggle means, said ratchet means including a block slidably carried on the outer of the telescoped tubular members, a rack along the outer tubular member fixed thereto and freely straddled by said block, a spring actuated pawl carried by said block engaging said rack, and said toggle means comprising a pair of toggle links pivotally connected at one end with the slidable block and at the opposite end pivoted to the inner one of the tubular members.

2. In a structure as set out in claim 1 said rack provided with an abutment positively limiting the outward movement of the telescoped members with respect to said slidable block.

3. In an extensible load bracing bar of the type comprising two telescoped tubular members with wall gripping pads at their outer ends and toggle means for forcing the sections outward for extending the bar, the improvement which comprises said sections provided with ratchet means for extending and contracting the overall length of the bar independently of said toggle means, said toggle means comprising toggle links pivoted together at one end to form the toggle knee and pivoted at their remote ends respectively to one of said telescoped members and at the opposite end pivoted to a block slidably carried on the other of said members and means for locking said block at any desired point therealong.

4. In an extensible load bracing bar of the type comprising two telescoped tubular members with wall gripping pads at their outer ends and toggle means for forcing the sections outward for extending the bar, the improvement which comprises said sections provided with ratchet means for extending and contracting the overall length of the bar independently of said toggle means, said toggle means comprising toggle links pivoted together at one end to form the toggle knee and pivoted at their remote ends respectively to one of said telescoped members and at the opposite end pivoted to a block slidably carried on the other of said members and means for locking said block at any desired point therealong, and means automatically positively locking said toggle means against either way of movement when the toggle links are straightened.

5. In an extensible load bracing bar of the type comprising two telescoped tubular members with wall gripping pads at their outer ends and toggle means for forcing the sections outward for extending the bar, the improvement which comprises said sections provided with ratchet means for extending and contracting the overall length of the bar independently of said toggle means, said toggle means comprising toggle links pivoted together at one end to form the toggle knee and pivoted at their remote ends respectively to one of said telescoped members and at the opposite end pivoted to a block slidably carried by the other of said members and means for locking said block at any desired point therealong, and means automatically positively locking said toggle means against either way of movement when the toggle links are straightened, comprising a recess formed in one of said members and a spring detent carried by the toggle links arranged to snap into the recess when the toggle links are straightened.

6. In an extensible load bracing bar of the type comprising two telescoped tubular members with wall gripping pads at their outer ends and toggle means for forcing the sections outward for extending the bar, the improvement which comprises said sections provided with ratchet means for extending and contracting the overall length of the bar independently of said toggle means, said toggle means comprising toggle links pivoted together at one end to form the toggle knee and pivoted at their remote ends respectively to one of said telescoped members and at the opposite end pivoted to a block slidably carried by the other of said members and means for locking said block at any desired point therealong, and means automatically positively locking said toggle means against either way of movement when the toggle links are straightened, comprising a recess formed in one of said members and a spring detent carried by the toggle links arranged to snap into the recess when the toggle links are straightened, said detent provided with a finger operated release to withdraw the detent for unlocking the toggle.

7. In an extensible load bracing bar of the type comprising two telescoped tubular members with wall gripping pads at their outer ends and toggle means for forcing the sections outward for extending the bar, said toggle means including two pairs of toggle links arranged respectively along opposite outer sides of the bar assembly and pivoted at their outer ends to react respectively against the inner and outer telescoped tubular members and cross connected over the bar by a yoke for simultaneously operating both sets of toggle links, the improvement which comprises side flanges formed on at least two of the oppositely disposed toggle links extending substantially at right angles to the plane of the links to provide a surface to press against in forcing the links to locked position.

8. In an extensible load bracing bar of the type comprising two telescoped tubular members with wall gripping pads at their outer ends and toggle means for forcing the sections outward for extending the bar, said toggle means including two pairs of toggle links arranged respectively along opposite outer sides of the bar assembly and pivoted at their outer ends to react respectively against the inner and outer telescoped tubular members and cross connected over the bar by a yoke for simultaneously operating both sets of toggle links, the improvement which comprises a hand grip formed on the outer part of said yoke.

9. In an extensible load bracing bar of the type comprising two telescoped tubular members with wall gripping pads at their outer ends and toggle means for forcing the sections outward for extending the bar, said toggle means including two pairs of toggle links arranged respectively along opposite outer sides of the bar assembly and pivoted at their outer ends to react respectively against the inner and outer telescoped tubular members and cross connected over the bar by a yoke for simultaneously operating both sets of toggle links, the improvement which comprises a finger gripping loop formed on the outer part of said yoke.

DORSEY W. JORDAN.

REFERENCES CITED

The following references are of record in the file of this patent:

UNITED STATES PATENTS

| Number | Name | Date |
|---|---|---|
| 923,463 | Taylor | June 1, 1909 |
| 945,334 | Lent | Jan. 4, 1910 |
| 964,305 | Oliver | July 12, 1910 |
| 1,763,034 | Bunker | June 10, 1930 |